Aug. 24, 1965

F. E. ROM 3,202,582

GASEOUS NUCLEAR ROCKET

Filed Aug. 28, 1961

INVENTOR
Frank E. Rom

BY

ATTORNEY

Aug. 24, 1965

F. E. ROM 3,202,582

GASEOUS NUCLEAR ROCKET

Filed Aug. 28, 1961

INVENTOR
Frank E. Rom

BY

ATTORNEY

3,202,582
GASEOUS NUCLEAR ROCKET
Frank E. Rom, Avon Lake, Ohio, assignor to the United
States of America as represented by the Administrator
of the National Aeronautics and Space Administration
Filed Aug. 28, 1961, Ser. No. 134,478
14 Claims. (Cl. 176—52)
(Granted under Title 35, U.S. Code (1952), sec. 266)

The invention described herein may be manufactured and used by or for the Government of the United States of America for governmental purposes without the payment of any royalties thereon or therefor.

This invention relates generally to nuclear propulsion systems and, more particularly, to a gaseous nuclear rocket.

Spacecraft for extraterrestrial flight has heretofore utilized conventional chemical rockets for propulsion systems. The specific impulses obtainable from the aforementioned present day chemical rockets are very low, being on the order of 250 to 450 pounds per pound of propellant flow per second, depending upon the fuel and oxidizer combination. Specific impulse is defined in the art as the pounds of thrust for each pound of propellant flow. Consequently, even a spacecraft provided with the best chemical rocket requires an extremely high assembled or gross weight. The gross weight may be broadly broken down into payload which includes the weight of the crew members, life-sustaining equipment, instrumentation and the like, and spacecraft structure-propulsion system weight which also includes propellant weight. It is well known that an increase in specific impulse enables either an increase in payload weight while maintaining a constant spacecraft gross weight or a reduction of the aforementioned gross weight while maintaining a constant payload weight.

The nuclear rocket overcomes the low specific impulses of chemical rockets in that fission therein produces about $10^7$ times more than the energy per unit mass than is available with the best chemical rocket propellant combination. The energy available therewith is utilized in an arrangement whereby the fission process cooperates with a working fluid, thereby heating the working fluid to a high temperature before it is exhausted through an exhaust nozzle. This above-mentioned concept is designated in the art as a nuclear heat-transfer rocket. By way of example is a solid fuel element reactor nuclear rocket wherein the fissionable matter is enclosed in solid materials having the characteristics of a high melting point, such as for example, the refractory materials of tantalum carbide or hafnium carbide. These materials have a melting point of approximately 7000° F. The kinetic energy of the fission products is changed to thermal energy which is transmitted from the fuel elements to a working fluid such as hydrogen passing through the reactor. Assuming the reactor is operating at a pressure of 1000 p.s.i.a. and 1500° F., a specific impulse of about 500 seconds is obtainable. As the hydrogen temperature is increased to 3000° F., 4500° F., and 6000° F., the specific impulse of the system increases to values of approximately 700, 900, and 1200 sec., respectively. A maximum impulse of 1200 sec. is about the highest that can be expected since it is obtained by heating the hydrogen to a temperature only about 1000° F. below the melting point of tantalum carbide or hafnium carbide. Obviously, therefore, the present state of metallurgical art limits the solid core reactor specific impulse to about 1200 sec.

In order to obtain even higher impulses, say on the order of magnitude of 3000 seconds, it will be necessary to heat the working fluid and, consequently, the reactor fuel elements to temperatures of approximately 15,000° F. Obviously, this temperature level is well above the melting point of any known materials available for containing or enclosing the fissionable material. However, a gaseous-core nuclear rocket is not limited by the material melting point. With this concept, a fissile material in a gaseous form is mixed with the working fluid in a heating cell. The working fluid temperature level is thereby increased to that of the gaseous fissioning material by direct contact of the working fluid with the fissioning material. The only temperature limitation therein is due to the ability of the incoming propellant to cool the heating cell and a reflector-moderator therearound.

A fundamental difficulty with the aforementioned gaseous reactor, however, is that the fissile material consumption is extremely large in that the fissile material will be carried away or swept out of the reactor, thereby increasing the fuel consumption to a rate much higher than that required by the heat output. The consumption is so great that it is not feasible to operate a gaseous reactor. In order to practically utilize the gaseous nuclear reactor, it is imperative that the fissile material residence or stay time be made many times greater than that of the working fluid.

Accordingly, one object of the instant invention is to provide a nuclear gaseous reactor wherein residence time of the fissile material is long relative to the working fluid.

Another object of the present invention is to provide a new and improved nuclear reactor having extremely high working fluid operating temperatures.

Still another object of the invention is to provide a technique of supplying a thermal radiation absorption blanket around the fissioning uranium gas.

A further object of the instant invention is to provide for a nuclear rocket engine having a higher specific impulse than that obtainable with solid fuel element nuclear rockets.

A still further object of the invention is to provide an improved reactor wherein the working fluid temperature is not limited by metallurgical consideration.

Still another further object of the present invention is to provide an improved reactor for a nuclear rocket propulsion system.

A still another further object of the instant invention is to provide a nuclear rocket propulsion system for increasing payload weights while maintaining a constant gross weight.

According to the present invention, the foregoing and other objects are obtained by introducing one or more streams of a working fluid concentrically adjacent to a gaseous fissile material in a heating chamber or cell. Introduction of a working fluid in this manner permits transfer of heat by radiation from the fissioning gaseous material and reduces mixing of the working fluid with the gaseous fissioning stream to a minimal, thereby increasing fissile material residence time relative to the working fluid.

A more complete appreciation of the invention and many of the attendant advantages thereof will be readily apparent as the same becomes better understood by reference to the following detailed description when considered in connection with the accompanying drawings wherein.

Figure 1:
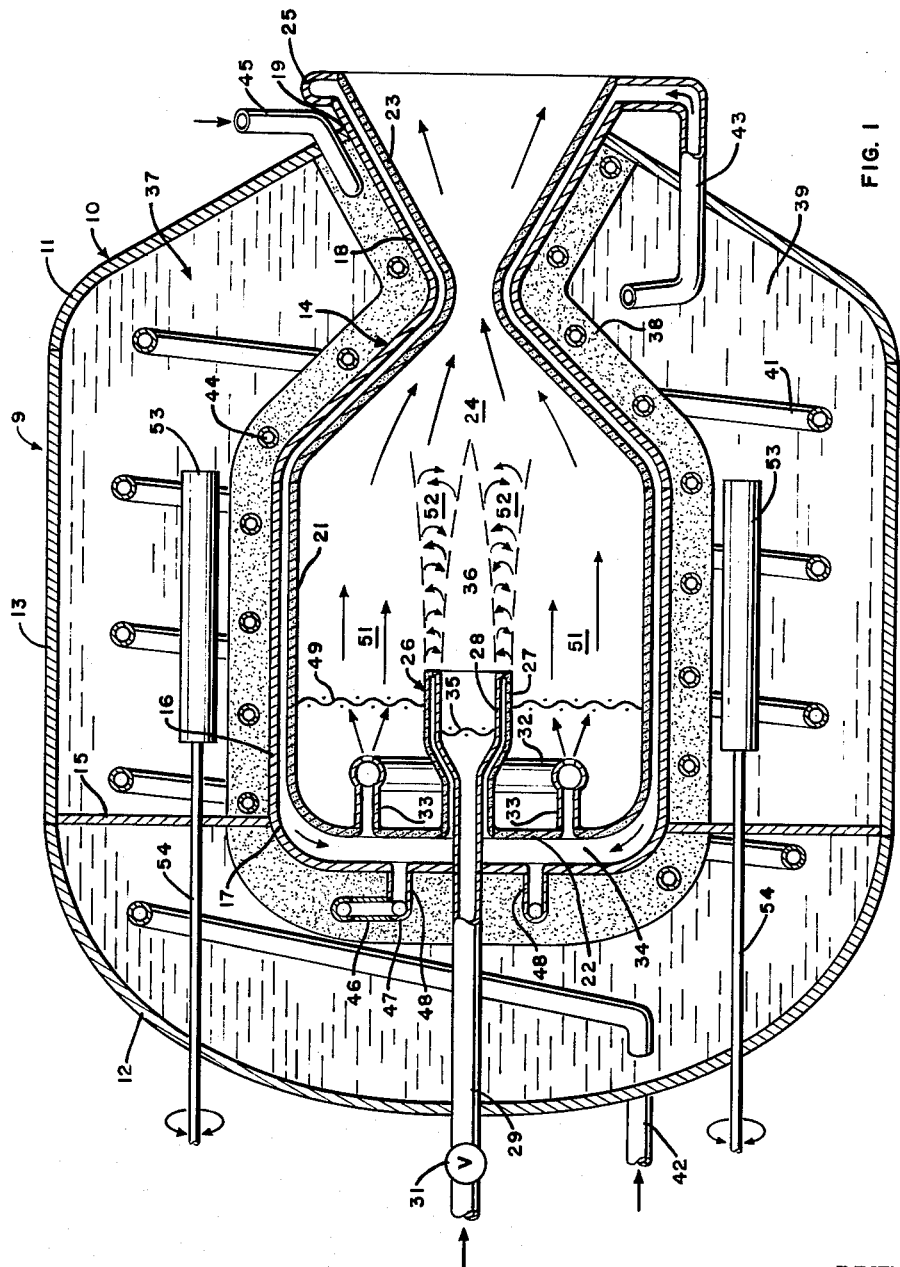
FIG. 1 is a side view, partly in section, of a nuclear rocket embodying the present invention.

Referring now to the drawings wherein like reference numerals designate identical or corresponding parts throughout the several views, there is shown in FIG. 1 a gaseous nuclear rocket 9. The nuclear rocket 9 is comprised of a load bearing outer shell 10 having a hemispheroidal rear end 11 and a forward end 12 attached to a casing 13. A double-wall heating cell 14 is axially disposed centrally within the outer shell 10 and connected thereto near the forward end 12 by a bulkhead 15. The exterior wall of the cell 14 includes a cylindrical elongated band 16 having an integrally-formed hemispheroidal fore end 17 and a nozzle 18 of the well known convergent-divergent type interconnected with the opposite end thereof. The convergent-divergent nozzle 18 projects outwardly of the shell rearward end 11 through an aperture 19 centrally formed therein. The interior cell wall, which is in spaced relationship with the exterior cell, is comprised of a cylindrical elongated band 21 having a hemispheroidal fore end 22 and a convergent-divergent nozzle 23 connected to the opposite end thereof, forming thereby a cavity 24. Liners (not shown) are positioned between the internal and external wall of the cell 14, thereby forming cooling passages therebetween. A circular manifold 25 is secured to the convergent-divergent nozzle exit plane, thereby providing for a coolant-working fluid inlet.

The heating cell walls are fabricated of a high temperature material, such as for example tungsten, which has an operating temperature level of about 5000° F. Porous tungsten is utilized for the interior cell wall to allow coolant escape, thereby further reducing heat loads by what is known in the art as porous cooling. One very difficult obstacle posed by the use of tungsten, however, is the high thermal neutron capture cross section and strong capture resonances thereof. Fortunately, there is an isotope of tungsten—tungsten 184—that has a rather low capture cross section and only one rather insignificant absorption resonance. Therefore, tungsten enriched with tungsten 184 is preferably used for the internal and external walls of the heating cell 14. In addition to the high temperature operational capabilities, tungsten also has the property of being resistant to corrosion by hydrogen at all temperatures up to the melting point. Generally, with nuclear rockets, hydrogen is used, both as the coolant because of its great heat-absorbing capacity, and as the working fluid because of its low molecular weight. Molecular weight is very important because system specific impulse is directly proportional to the velocity of the fluid flowing through an exhaust nozzle which is functionally related to the molecular weight. By decreasing the molecular weight, the jet velocity is increased for a given temperature level; therefore, all other parameters remaining equal, the system specific impulse is thereby directly increased.

A fissile material injection nozzle 26 of circular cross-sectional shape, which has one end in communication with the fore end of the cell 14 and an enlarged portion at the opposite end, protrudes inwardly along the reactor axial centerline. The nozzle 26 is of a double-wall construction having an outer section 27 and an inner section 28 and is suitably secured to the exterior cell fore end 22 and interior cell fore end 17, respectively, to provide for regenerative cooling. A conduit 29 having one end thereof connected to a pressurized source (not shown) of gaseous fissile material, such as uranium hexafluoride or the like, is secured to the nozzle inner section 28. A control valve 31 is disposed in the conduit 29 for regulating flow therethrough of the gaseous fissile material. The nozzle 26 is preferably fabricated of tungsten enriched with the isotope 184 for reasons hereinbefore explained and has a non-porous inner section 28 and a porous outer section 27 for porous cooling thereof. The conduit 29 may be constructed of regular tungsten or other similar material and is coated with a neutron-absorbing material such as cadmium or boron, for example, thereby preventing fission therein.

Injection of a working fluid into the cavity 24 is accomplished by a toroidal nozzle 32 concentrically circumscribing the circular nozzle 26. Piping 33 interconnects the toroidal nozzle 32 and cooling passage 34 formed by exterior cell fore end 17 and interior cell fore end 22.

In operation of the nuclear reactor 9, gaseous fissile material from the pressurized source (not shown) is introduced into the circular nozzle 26 via conduit 29. The fissile material may also be introduced into the circular nozzle 26 in solid rod form and therein vaporized to a gaseous state. Flow irregularities may be smoothed by a settling screen 35 disposed in the enlarged portion of the nozzle 26. The fissile material is then injected into the cavity 24 and concentrated in zone 36 thereof. As is well known in the art, a definite amount of a gaseous fissile material at a corresponding pressure level must be concentrated in zone 36 before the reactor can go "critical"; that is, just enough fissionable material to enable the initiation of a chain reaction. The amount of fissile material necessary for criticality or the initiation of a chain reaction also generally depends upon the cavity volume and the efficiency of a reflector-moderator in returning neutrons to the cavity 24. The chain reaction which may be started by stray neutrons from the cosmos or artificial sources, is maintained by surrounding the gaseous fissionable material in zone 36 with a reflector-moderator 37 which is herein situated between the cell 14 and outer shell 10. The reflector-moderator 37 reflects back into the chain-reacting zone 36 neutrons which would otherwise be lost as a result of leakage.

The reflector-moderator utilized with the instant invention consists of two parts, a graphite first part 38 disposed between the cell 14 and outer shell 10 in juxtaposition to the external cell wall, and a heavy water second part 39 situated between the graphite 38 and shell 10. Both the graphite reflector-moderator 38 and heavy water reflector-moderator 39 are maintained within operable temperature limits by heat exchangers utilizing the hydrogen working fluid as a coolant. By way of example, a spiral tube heat exchanger 41 is shown as being immersed in the heavy water 39, having an inlet 42 thereof connected to a source of liquid hydrogen (not shown) and an exit 43 in communication with the inlet manifold 25 of the double wall cell 14. As the liquid hydrogen passes through the spiral tube it vaporizes therein, thereby absorbing heat from the heavy water whereby the heavy water temperature is maintained within acceptable limits. The now hydrogen gas flows into the inlet manifold 25 and then through the double wall cell 14, providing cooling therefor, and finally into the toroidal nozzle 32. A small amount of the hydrogen is dissipated directly into the cavity 24 by leakage through the porous walls. A second spiral heat exchanger 44 is imbedded in the graphite reflector-moderator 38 for the maintaining thereof at an acceptable temperature level. This heat exchanger has an inlet 45 connected to a source of liquid hydrogen (not shown) and the exit 46 in communication with a manifold 47. Tubes 48 connect the manifold 47 to the cell fore end cooling passage 34, thereby permitting access of this portion of the hydrogen working-cooling fluid to the toroidal nozzle 32. The spiral tube heat exchangers are not to be regarded as shape limited since any other conventional heat exchanger may be used.

It is recognized that heavy water is a better moderator than graphite because it is more effective in slowing down neutrons and has a very low absorption cross section. However, a dual form of reflector-moderator is utilized with the present invention to provide for the greatest increase of cavity hydrogen gas temperatures by reducing cavity hydrogen gas cooling due to cell interior wall temperature, and limitations imposed on the hydrogen gas temperature due to energy transfer to the hydrogen while it is regeneratively cooling the cell 14 and the reflector-moderator 37 prior to its entry into the toroidal nozzle 32. This limitation comes about because about ten percent of the fission process energy is in the form of high energy neutrons and gamma radiation. The neutron energy and gamma energy is given up almost entirely within the reflector-moderator 37. This energy must be removed from the reflector-moderator 37 in order to maintain the temperature thereof at an acceptable level. By utilizing tungsten for the interior and exterior cell wall and backing the exterior cell wall with a first moderator of graphite, the temperature level of the interior cell wall may approach 5000° F., thereby allowing a hydrogen cavity temperature of 15,000° F., whereby a system specific impulse of about 3000 sec. is provided.

The graphite thickness is primarily determined by nuclear considerations. It is made thick enough to enable the major portion of the neutron and gamma energy to be absorbed within the graphite. The heavy water will then be subjected to very minor heating in order that it can be cooled by the heat exchanger, thereby preventing vaporization of the heavy water. Heavy water having the same physical characteristics as regular water will, of course, boil at approximately 212° F. at atmospheric pressure. However, by enclosing the heavy water at higher pressures than atmospheric, the boiling point thereof may be thereby increased to a practical temperature limit of about 500° F.

It is not necessary to utilize graphite as part of the reflector-moderator 37. Heavy water may be used throughout or in combination with beryllium or its oxide, for example. However, lower cavity hydrogen gas temperatures would result. For example, if heavy water would be used throughout, the interior cell wall would be then limited to a temperature level of about 500° F. The hydrogen in cavity 24 would then be raised only to about 6500° F. With this temperature, a specific impulse of approximately 1200 sec. can be obtained.

After providing cooling for the nuclear rocket 9, the hydrogen in its now gaseous state is injected by the toroidal nozzle 32 into the heating cell cavity 24 in a concentric or coaxial manner. An annular settling screen 49 may be positioned between the circular nozzle 26 and interior cell band 21 for smoothing hydrogen gas flow irregularities.

The hydrogen gas is injected into the cavity 24 in a concentric manner 51, adjacent to the fissile material in zone 36 at the same pressure as the fissile material so as to prevent mixing and for maintaining the pressure required for criticality of the gaseous fissile material in zone 36. Pressure loads on the heating cell are transmitted through the reflector-moderator 37 to the load-bearing outer shell 10. By introducing the hydrogen in a coaxial manner, a buffer or shear zone 52 is created where the gaseous fissile material adjacent to the hydrogen makes contact, thus eliminating the complete mixing as occurs in conventional gaseous reactors. Although the shear or buffer layer 52 effects mixing of the gaseous fissile material in zone 36 with the concentric stream of hydrogen, the mixing process is slow compared to the velocity of the uranium gas, thereby providing for a "critical" quantity of unmixed, and therefore unaccelerated, fissile material. In addition, the fact that the uranium gas is of a larger density slows the mixing process. Consequently, the major quantity of gaseous fissile material is retained in zone 36, thereby providing a greater residence time and reducing the consumption of same to a minimum. If possible, the most desirable arrangement would be to have the gaseous fissile material remain in zone 36 until completely fissioned, being replenished as necessary through circular nozzle 26 to maintain criticality.

The heat from the fission process occurring in zone 36 causes the temperature to be extremely high, on the order of tens of thousands of degrees. The energy thus released must ultimately be transferred to the hydrogen by one or more of the following processes: (1) forced convection heat transfer; (2) fission fragment kinetic energy transfer; and (3) thermal radiation heat transfer. Because the energy transferred by processes (1) and (2) are very small, the major portion of heat must be transferred to the hydrogen by radiation. In order to assure that the hydrogen gas is heated to a high temperature, a seeding material such as carbon particles having a diameter of approximately 200 microns is mixed therewith, thus forming an opaque composition, thereby insuring absorption of heat by the hydrogen.

Control of the fissioning process in zone 36 is maintained by a plurality of rotatable drums 53 positioned between the graphite reflector-moderator 37 and the heavy water heat exchanger 41, thereby providing a suitable effective multiplication factor. Effective multiplication factor is defined as the ratio of the average number of neutrons produced by fission in each generation to the total number of corresponding neutrons absorbed by the reflector moderators, structure, control drums, and the like. If the multiplication factor is less than one, fission will not continue. The control drums 53 consist of a solid cylinder, half of each being poisoned, that is coated with a neutron-absorbing material, and the other half being coated with a non-absorbing neutron material. A rod 54 is connected to each of the drums 53. The drums 53 are rotatably controlled by external electric motors (not shown) geared to the opposite end of the rods 54. To reduce the power level of the reactor, the poisoned portion of the drums 53 is rotated so that they are exposed to the neutrons emanating from zone 36, thereby absorbing them. Conversely, to increase the power level of the reactor, the poisoned portions of the drums 53 are rotated away from the fissioning zone 36.

Figure 2:
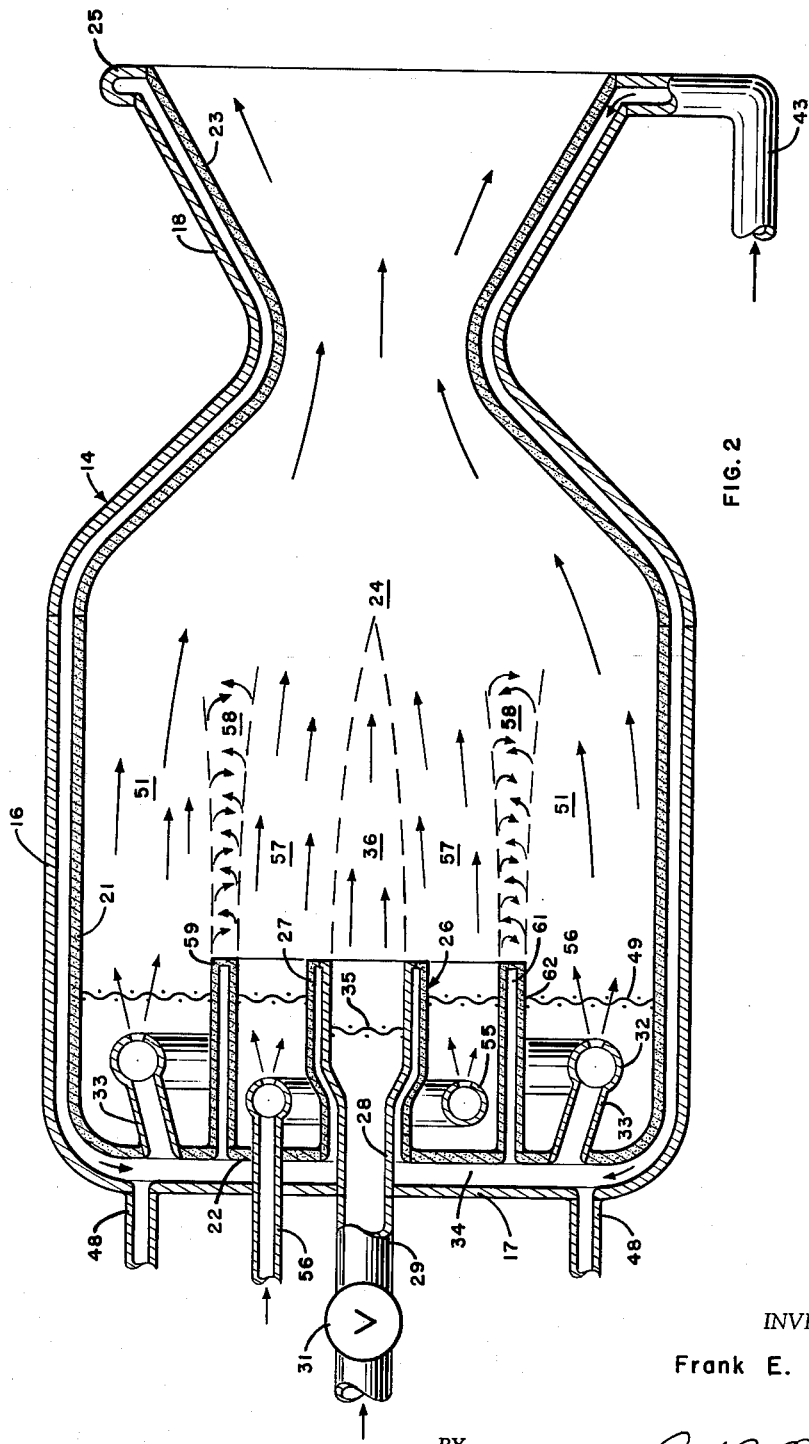
FIG. 2 is a schematic side view of a heating cell embodying an alternative application of the instant invention.

In FIG. 2 the heating cell 14 of the nuclear rocket 9 is shown utilizing an alternative embodiment of the present invention. A second toroidal nozzle 55, which is in communication via a pipe 56 to a secondary pressurized source of gaseous hydrogen (not shown) is positioned within the cell 14 concentric to the circular nozzle 26. This second toroidal nozzle 55 provides for injecting a secondary quantity of hydrogen 57 into the cavity 24 circumaxial to the gaseous fissile material being injected by circular nozzle 26 at a velocity and pressure equal to that of the injected gaseous fissile material, thereby eliminating shear stresses and mixing therebetween. Rather mixing and shear stresses now occur in zone 58 between the secondary flow of hydrogen 57 injected by nozzle 55 and the primary or main flow of hydrogen 51 injected by nozzle 32 with the secondary hydrogen flow acting as a buffer zone between the hydrogen flow 51 and gaseous fissile material concentrated in zone 36. The injection of two concentric hydrogen streams in this manner provides for even greater increases in gaseous fissile material residence time within cavity 24 than with a single coaxial injection of hydrogen, as discussed with reference to FIG. 1, because shear forces and mixing now occur in zone 58 which is between the main flow of hydrogen and secondary flow of hydrogen. The amount of secondary hydrogen injected into the cavity 24 by nozzle 55 depends upon the amount of gaseous fissile material being injected by circular nozzle 26 and is controlled by a valve (not shown) disposed in pipe 56.

A band 59 fabricated of porous tungsten enriched with tungsten 184, and having a free end and an opposite end secured to the interior cell fore end 22 is concentrically disposed within the heating cell 14 between the circular nozzle 26 and interior cell band 21. A hollow passage 61 is formed along the entire circumference of the band, the secured end of which is so affixed to the fore end 22 that communication of the band hollow passage 61 with passage 34 is thereby provided to permit coolant-working fluid flow. The band free end extends through an aperture 62 in the annular screen and terminates in the vertical exit plane of the circular nozzle 26. The band 59 provides for separation of the secondary and primary flow of hydrogen up to the vertical exit plane of gaseous fissile material injection nozzle 26, thereby increasing the effectiveness of utilizing a secondary flow of hydrogen as a buffer zone by delaying mixing of the primary hydrogen flow and secondary hydrogen flow.

Obviously, there are many other methods of introducing the working fluid into the reactor cavity. For example, the nozzle injecting the working fluid stream adjacent to the gaseous fissile material stream may be shaped in a manner to provide transverse velocity components. This also would provide a stagnant buffer region, thereby hindering momentum transfer.

The present invention overcomes the heretofore impractical aspect of a conventional gaseous nuclear rocket; that is, the high consumption of a gaseous fissile material therewith by introducing a working fluid concentrically adjacent the gaseous fissile material. This principle also provides a thermal-absorbing blanket circumscribing the gaseous fissile material, thereby helping to reduce temperature loading of the heating cell walls. Moreover, the present invention provides for utilizing a working fluid heated to higher temperatures than any known material melting point, thus providing specific impulses up to several times that of hte highest energy chemical rocket and three times that of the conventional nuclear rocket. By increasing specific impulse, greater payloads may be carried without increasing vehicle gross weight.

Obviously, many modifications and variations of the present invention are possible in the light of the above teachings. It is, therefore, to be understood that within the scope of the appended claims the invention may be practiced other than as specifically described.

What is claimed is:

1. A gaseous nuclear reactor comprising
an outer shell,
a double wall heating cell axially disposed within said outer shell, said cell including a casing having an integral hemispheroidal fore end and a convergent-divergent nozzle in communication with the casing aft end,
a double wall circular nozzle protruding inwardly within said heating cell along the center line thereof, said circular nozzle having one end secured to said double wall hemispheroidal fore end, and in communication with a source of gaseous fissile material,
a hollow band positioned within said heating cell in spaced concentric relationship with said circular nozzle, said band having a free end terminating in close proximity to the vertical exit plane of said circular nozzle and a secured end in communication with said hemispheroidal fore end,
a toroidal nozzle concentrically positioned within said heating cell between said band and said casing, said toroidal nozzle being in communication with said fore end,
a second toroidal nozzle concentrically positioned within said heating cell between said band and said circular nozzle,
a graphite reflector-moderator adjacently disposed to said heating cell,
means for cooling said graphite reflector-moderator,
a heavy water reflector-moderator disposed between said graphite reflector-moderator and said outer shell,
means for cooling said heavy water reflector-moderator, and
a plurality of control drums situated between said graphite reflector-moderator and said heavy water reflector-moderator cooling means.

2. The gaseous nuclear reactor of claim 1 in which said heating cell is composed of tungsten enriched with tungsten 184.

3. A gaseous nuclear reactor comprising
an outer shell,
a heating cell disposed within said outer shell,
nozzle means for injecting a gaseous fissile material into said heating cell,
first toroidal nozzle means for injecting a primary quantity of propellant concentric to the injected gaseous fissile material,
second toroidal nozzle means for injecting a secondary quantity of propellant concentrically adjacent to the injected primary quantity of propellant and the injected gaseous fissile material, equal in pressure and velocity to the injected gaseous fissile material, thereby forming a buffer region between the injected gaseous fissible material and the primary injected quantity of propellant,
a first reflector-moderator formed of graphite adjacently disposed to said heating cell,
means for cooling said first reflector-moderator,
a second reflector-moderator composed of heavy water situated between said first reflector-moderator and said outer shell,
means for cooling said second reflector-moderator, and
means for controlling the fission power level of the injected gaseous fissile material within said heating cell.

4. The gaseous nuclear reactor of claim 3 and including means for initially separating the injected primary quantity of propellant and the injected secondary quantity of propellant.

5. A gaseous nuclear reactor comprising
an outer shell,
a heating cell disposed within said outer shell,
nozzle means for injecting a gaseous fissile material into said heating cell,
first toroidal nozzle means for injecting a primary quantity of propellant concentric to the injected gaseous fissile material,
second toroidal nozzle means for injecting a secondary quantity of propellant concentrically adjacent to the injected primary quantity of propellant and the injected gaseous fissile material, equal in pressure and velocity to the injected gaseous fissile material, thereby forming a buffer region between the injected gaseous fissile material and the primary injected quantity of propellant,
neutron reflector-moderator means for reflecting neutrons back into said heating cell,
means for cooling said reflector-moderator, and
means for controlling the fission power level of the injected gaseous fissile material within said heating cell.

6. The gaseous nuclear reactor of claim 5 and including means for initially separating the injected primary quantity of propellant and the injected secondary quantity of propellant.

7. A gaseous nuclear reactor comprising
an outer shell,
a double wall heating cell axially disposed within said outer shell, said cell including a casing having an integral hemispheroidal fore end and a nozzle in communication with the casing aft end,
a double wall circular nozzle protruding inwardly within said heating cell along the center line thereof, said circular nozzle having one end secured to said double wall hemispheroidal fore end,
a toroidal nozzle positioned within said heating cell in concentric relationship with said circular nozzle,
a graphite reflector-moderator in juxtaposition to said heating cell,
means for cooling said graphite reflector-moderator,
a heavy water reflector-moderator disposed between said graphite reflector-moderator and said outer shell,
means for cooling said heavy water reflector-moderator, and
a plurality of control drums situated between said graphite reflector-modulator and said heavy water reflector-moderator cooling means.

8. The gaseous nuclear reactor of claim 7 in which said heating cell is composed of tungsten enriched with tungsten 184.

9. A gaseous nuclear reactor comprising
an outer shell,
a heating cell disposed within said outer shell, nozzle means for injecting a gaseous fissile material into said heating cell, toroidal nozzle means for injecting a propellant concentrically adjacent to the injected gaseous fissile material, a first reflector-moderator formed of graphite in juxtaposition to said heating cell, means for cooling said first reflector-moderator, a second reflector-moderator composed of heavy water situated between said first reflector-moderator and said outer shell, means for cooling said second reflector-moderator, and means for controlling the fission power level of the injected gaseous fissile material within said heating cell.

10. A gaseous nuclear reactor comprising an outer shell, a heating cell disposed within said outer shell, nozzle means for injecting a gaseous fissile material into said heating cell, toroidal nozzle means for injecting a propellant concentrically adjacent to the injected gaseous fissile material, neutron reflector-moderator means for reflecting neutrons back into said heating cell, means for cooling said reflector-moderator means, and means for controlling the fission power level of the injected gaseous fissile material within said heating cell.

11. In a gaseous nuclear reactor having a heating cell cavity in communication with a pressurized source of gaseous fissile material and a supply of hydrogen gas, the improvement comprising a circular nozzle fabricated of tungsten enriched with the isotope 184 in communication with said pressurized source for injecting a circular stream of gaseous fissile material into said cavity to form a chain-reacting zone, and a toroidal nozzle concentrically circumscribing said circular nozzle for injecting an annular stream of hydrogen gas into said cavity coaxially with said stream of gaseous fissile material whereby a buffer zone is created adjacent said chain-reacting zone to prevent mixing of the gaseous fissile material and the hydrogen by providing greater residence time for said fissile material.

12. A reactor as claimed in claim 11, including a circular settling screen disposed in said circular nozzle for smoothing irregularities in the flow of said gaseous fissile material, and an annular settling screen positioned adjacent said toroidal nozzle for smoothing the hydrogen gas flow.

13. A reactor as claimed in claim 11, including a reflector-moderator surrounding said chain-reacting zone for reflecting neutrons back into said zone.

14. A reactor as claimed in claim 13, wherein said reflector-moderator comprises a graphite portion surrounding said chain-reacting zone, and a heavy water portion surrounding said graphite portion.

References Cited by the Examiner

UNITED STATES PATENTS

| | | | |
|---|---|---|---|
| 2,975,116 | 3/61 | Daniels | 178—45 |
| 3,039,945 | 6/62 | Slack et al. | 176—45 |
| 3,058,897 | 10/62 | Slack et al. | 176—45 |

FOREIGN PATENTS

| | | |
|---|---|---|
| 167,674 | 5/52 | Australia. |
| 798,617 | 7/58 | Great Britain. |

OTHER REFERENCES

R. W. Bussard et al.: Nuclear Rocket Propulsion, McGraw-Hill Book Co., New York, 1960, pp. 322–327.

Corliss, William R., Propulsion Systems for Space Flight, McGraw-Hill Book Co., New York, 1960, p. 161–167.

Aero-Space Engineering, February 1959, pp. 50–53.

Astronautics, October 1959, pp. 23, 24, 22, 46, 48, 50.

REUBEN EPSTEIN, *Primary Examiner.*

CARL D. QUARFORTH, *Examiner.*